US009481156B2

(12) United States Patent
Igi

(10) Patent No.: US 9,481,156 B2
(45) Date of Patent: Nov. 1, 2016

(54) LONG CASING PATCH METHOD

(71) Applicant: KANTO NATURAL GAS DEVELOPMENT CO., LTD., Mobara-shi (JP)

(72) Inventor: Toshikazu Igi, Mobara (JP)

(73) Assignee: KANTO NATURAL GAS DEVELOPMENT CO., LTD., Mobara-Shi (JP)

( * ) Notice: Subject to any disclaimer, the term of this patent is extended or adjusted under 35 U.S.C. 154(b) by 141 days.

(21) Appl. No.: 14/408,508

(22) PCT Filed: Mar. 26, 2014

(86) PCT No.: PCT/JP2014/058493
§ 371 (c)(1),
(2) Date: Dec. 16, 2014

(87) PCT Pub. No.: WO2015/083384
PCT Pub. Date: Jun. 11, 2015

(65) Prior Publication Data
US 2015/0352823 A1    Dec. 10, 2015

(30) Foreign Application Priority Data

Dec. 3, 2013  (JP) ................. 2013-249847

(51) Int. Cl.
*E21B 29/10* (2006.01)
*B29C 63/40* (2006.01)
*B29C 63/44* (2006.01)
*B32B 37/14* (2006.01)

(52) U.S. Cl.
CPC ............. *B32B 37/142* (2013.01); *B29C 63/40* (2013.01); *B29C 63/44* (2013.01); *E21B 29/10* (2013.01); *B32B 2305/00* (2013.01); *B32B 2597/00* (2013.01); *Y10T 156/1002* (2015.01); *Y10T 156/1028* (2015.01)

(58) Field of Classification Search
None
See application file for complete search history.

(56) References Cited

U.S. PATENT DOCUMENTS

| 5,664,628 A | 9/1997 | Koehler et al. |
| 5,695,008 A | 12/1997 | Bertet et al. |
| 5,833,001 A | 11/1998 | Song et al. |

FOREIGN PATENT DOCUMENTS

| JP | 2001-020653 A | 1/2001 |
| JP | 2010-077767 A | 4/2010 |

*Primary Examiner* — Barbara J Musser
(74) *Attorney, Agent, or Firm* — Knobbe Martens Olson & Bear LLP

(57) ABSTRACT

To reduce operation time and ensure strength of a covering member.
The method includes; causing the first sheet to memorize a shape of curvature having a predetermined radius of curvature by curing a first resin while holding the first sheet with the predetermined radius of curvature, the first sheet being impregnated with the first resin (S1); wrapping the first sheet around a radially expandable cylindrical packer and tentatively fastening the first sheet to the packer, wherein the packer has a radius that is smaller than the predetermined radius of curvature (S3); forming a laminated sheet assembly by attaching a plurality of sheets to each other with a second resin (S2); forming the covering member by wrapping the laminated sheet assembly around an outer surface of the first sheet via a third resin and tentatively fastening the laminated sheet assembly, the first sheet being wrapped around the packer (S4); applying a fourth resin to an outer surface of the laminated sheet assembly of the covering member and inserting the packer into a cylindrical tube (S5); radially expanding the packer in the cylindrical tube to release the tentative fastening of the first sheet and the laminated sheet assembly, thereby pressing the covering member against an inner wall of the cylindrical tube via the fourth resin (S6); pulling out the packer from the cylindrical tube (S7); and curing the second (S8).

12 Claims, 8 Drawing Sheets

Fig.8
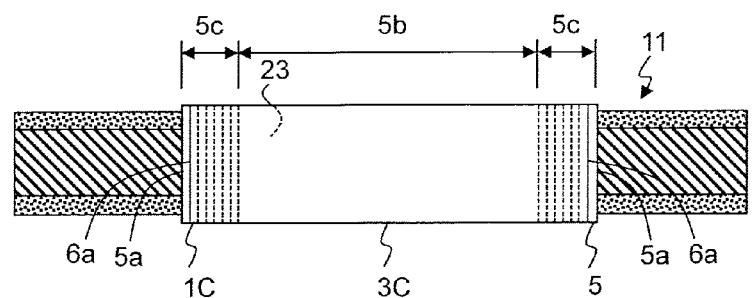
Fig.9A  Fig.9B  Fig.9C
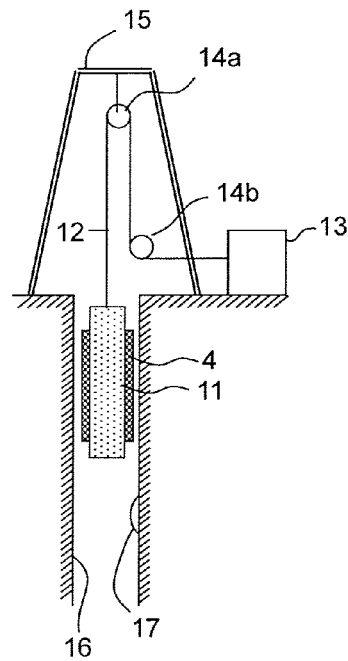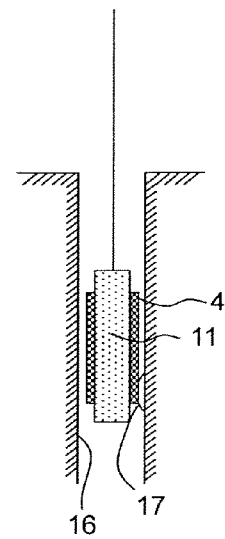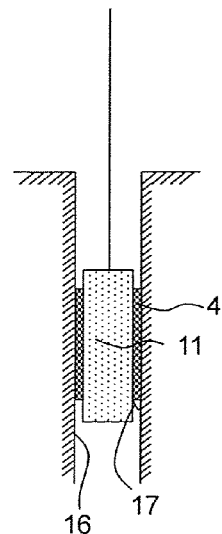

Fig.12A
Fig.12B
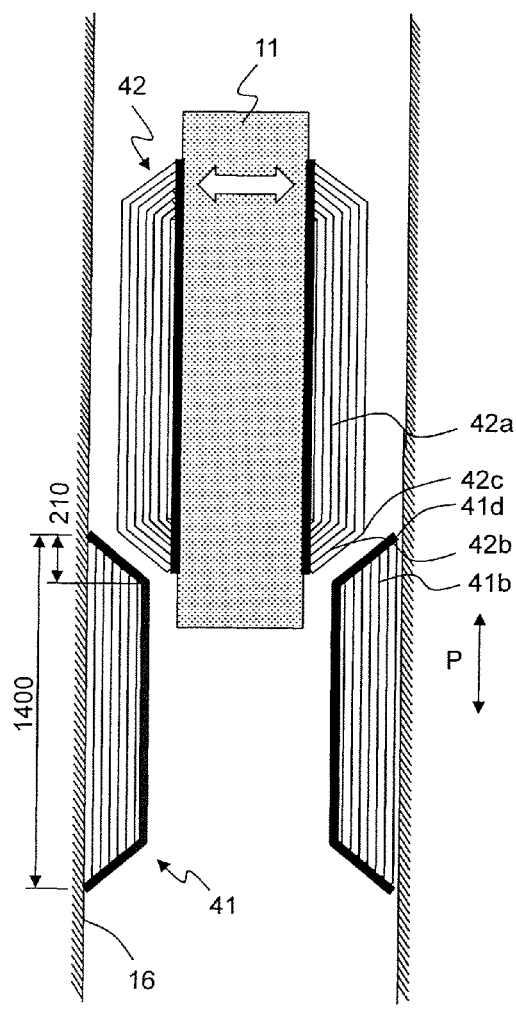
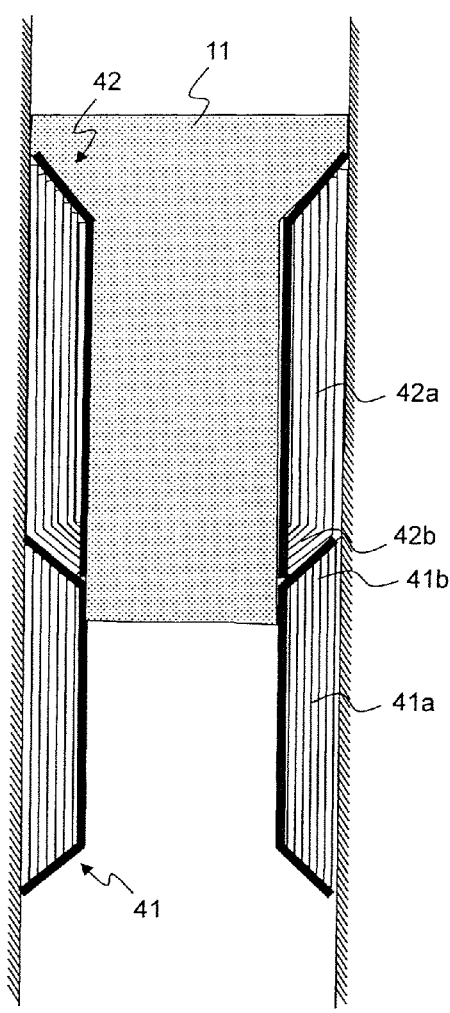

LONG CASING PATCH METHOD

CROSS-REFERENCE TO RELATED APPLICATIONS

This application is the U.S. National Phase under 35. U.S.C. §371 of International Application PCT/JP2014/058493, filed Mar. 26, 2014, which claims priority to Japanese Patent Application No. 2013-249847, filed Dec. 3, 2013. The disclosures of the above-described applications are hereby incorporated by reference in their entirety.

TECHNICAL FIELD

The present invention relates to a method for mounting a covering member to an inner wall of a cylindrical tube, and more particularly to a method for mounting a covering member to an inner wall of an open hole, an oil well, a gas well, a hot spring well, a water well, a reinjection well, or the like.

BACKGROUND ART

A method for repairing underground cylindrical tubes, such as an open hole, an oil well, a gas well, a hot spring well, a water well, a reinjection well, or the like, is known. According to Patent Literature 1, a polyethylene film is wrapped around a radially expandable packer, and a covering member impregnated with resin is wrapped around the polyethylene film. The packer is then suspended down into the cylindrical tube and is radially expanded. The covering member is pressed against the inner wall of the cylindrical tube and is kept in that state until the resin is cured. Then, the packer is pulled up in order to complete the repair of the cylindrical tube.

According to Patent Literature 2, a covering member having a slit that longitudinally extends from one end to the other end is wrapped around a packer. The covering member is radially contracted in advance to an outer diameter that is smaller than the inner diameter of a cylindrical tube. Specifically, the covering member is wrapped around a radially expandable packer and is radially contracted so that circumferentially opposed ends of the slit overlap each other. An adhesive is applied to the outer surface of the covering member. The packer is then suspended down into the cylindrical tube and is radially expanded. The covering member is pressed against the inner wall of the cylindrical tube due to the elastic reactive force of the covering member. According to this method, the packer can be pulled up at an early stage because the covering member is held in the cylinder by its own elastic reactive force.

Patent Literature 1: JP2001-20653A
Patent Literature 2: JP2010-77767A

SUMMARY OF INVENTION

In the method described in Patent Literature 1, the packer cannot be pulled up until the resin is cured. It is impossible even to contract the packer before resin that adheres to the polyethylene film is cured, and as a matter of course, the resin that adheres to the inner wall of the cylinder needs to be cured. According to Patent Literature 1, the packer needs to be held in the cylindrical tube for about 24 hours and reduction of operation time is difficult. In the method described in Patent Literature 2, the thickness of the covering member is limited in order to facilitate radial contraction of the covering member, and thus it is difficult to ensure strength of the covering member.

The present invention aims at providing a method for mounting a covering member to an inner wall of a cylindrical tube which can be performed in a short time and which is capable of easily ensuring strength of the covering member.

A mounting method for attaching a covering member to an inner wall of a cylindrical tube according to the present invention relates to a method for attaching a covering member having a first sheet and a laminated sheet assembly to a sidewall of the cylindrical tube. The mounting method includes:

causing the first sheet to memorize a shape of curvature having a predetermined radius of curvature by curing a first resin while holding the first sheet with the predetermined radius of curvature, the first sheet being impregnated with the first resin;

wrapping the first sheet around a radially expandable cylindrical packer and tentatively fastening the first sheet to the packer, wherein the first sheet memorizes the shape of curvature and the packer has a radius that is smaller than the predetermined radius of curvature;

forming a laminated sheet assembly by attaching a plurality of sheets to each other with a second resin;

forming the covering member by wrapping the laminated sheet assembly around an outer surface of the first sheet via a third resin and tentatively fastening the laminated sheet assembly, the first sheet being wrapped around the packer;

applying a fourth resin to an outer surface of the laminated sheet assembly of the covering member;

inserting the packer into a cylindrical tube having a radius that is smaller than the predetermined radius of curvature and that is larger than a radius of an outer surface of the fourth resin;

radially expanding the packer in the cylindrical tube to release the tentative fastening of the first sheet and the laminated sheet assembly, thereby pressing the covering member against an inner wall of the cylindrical tube via the fourth resin;

pulling out the packer from the cylindrical tube; and curing the second, third, and fourth resins to attach the covering member to the sidewall of the cylindrical tube.

The first sheet memorizes the shape of curvature having a predetermined radius of curvature. Since the first sheet is wrapped around a packer having a radius that is smaller than the predetermined radius of curvature, an elastic reactive force is generated when the packer is radially expanded to release the tentative fastening after the packer is inserted into the cylindrical tube. Thus, the laminated sheet assembly wrapped around the first sheet is pressed against the inner wall of the cylindrical tube and is attached to the inner wall of the cylindrical tube by means of the fourth resin. The packer does not need to be kept in the cylindrical tube until the second to fourth resins are cured and can be immediately pulled up from the cylindrical tube. Accordingly, operation time can be reduced. The required strength of the covering member can be easily ensured since the covering member is made up of the first sheet and the laminated sheet assembly. Thus, the present invention can provide a method for mounting a covering member to an inner wall of a cylindrical tube which can be performed in a short time and which is capable of easily ensuring strength of the covering member.

BRIEF DESCRIPTION OF DRAWINGS

FIG. 8 is a side view of the laminated sheet assembly wrapped around the packer.

FIG. 9A is a conceptual diagram illustrating the method for inserting and mounting the covering member into a cylindrical tube.

FIG. 9B is a conceptual diagram illustrating the method for inserting and mounting the covering member into the cylindrical tube.

FIG. 9C is a conceptual diagram illustrating the method for inserting and mounting the covering member into the cylindrical tube.

FIG. 12A is a schematic view illustrating the method for attaching a second covering member to the sidewall of the cylindrical tube.

FIG. 12B is a schematic view illustrating the method for attaching the second covering member to the sidewall of the cylindrical tube.

Figure 1:
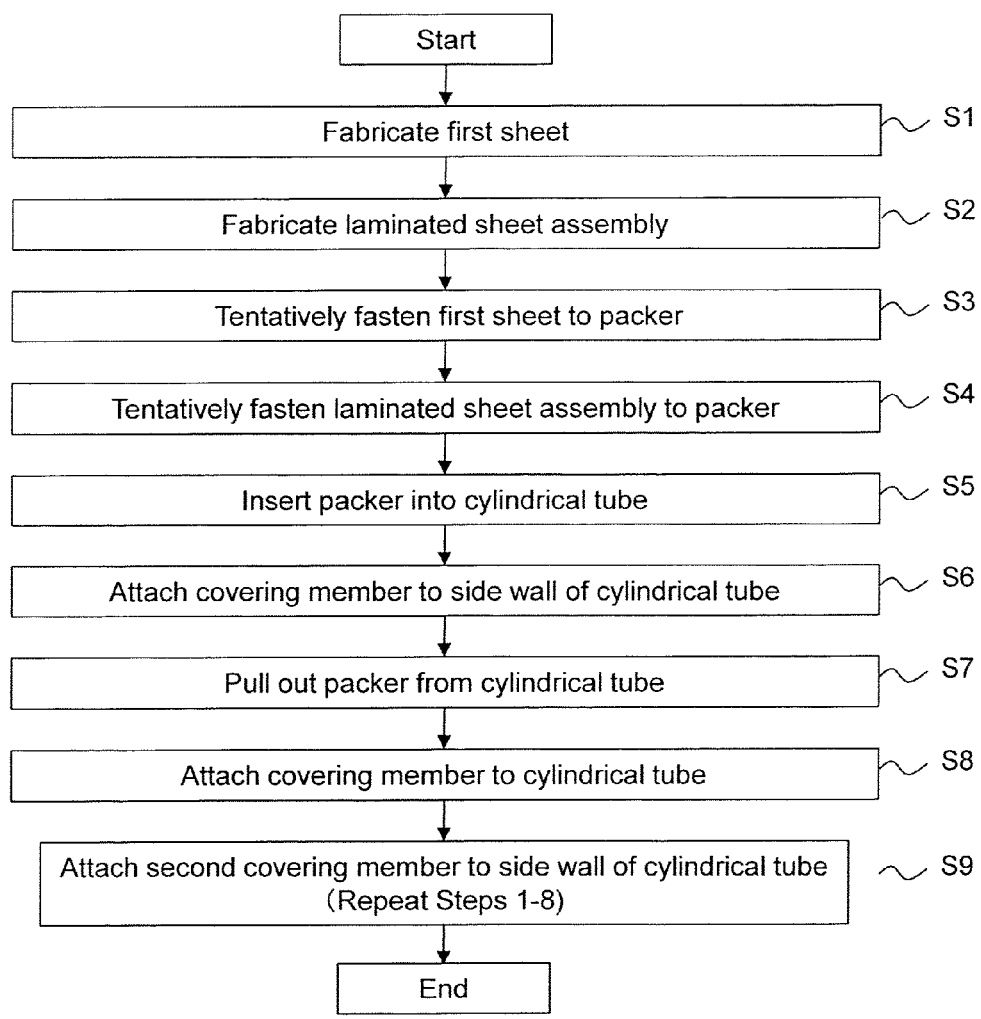
FIG. 1 shows the steps of a method for mounting a covering member according to an embodiment of the present invention.

DESCRIPTION OF REFERENCE NUMERALS 1C first glass cloth
1G first chopped strand mat
1R first roving cloth
2G second chopped strand mat
2C second glass cloth
3G third chopped strand mat
3C third glass cloth
4 covering member
4b tapered portion
5 first sheet
6 laminated sheet assembly
7 core
11 packer
21 to 24 first to fourth resins
41 first covering member
42 second covering member

DESCRIPTION OF EMBODIMENT

Embodiments of the present invention will now be described with reference to the drawings. The present invention is preferably applied to any type of cylindrical tube having a cylindrical inner surface, such as an oil well tube, a gas well tube, a water well, a hot spring well and a reinjection well. The present invention is also preferably applied to a cylindrical tube or an open hole that has an opening exposed at a ground surface and that linearly extends in a horizontal or oblique direction, a cylindrical tube or an open hole that contains liquid, such as groundwater, therein, and a rock cavity for geological disposal of high level radioactive waste. The present invention is preferably applied to repairing of a cylindrical tube or an open hole, as well as a newly constructed cylindrical tube or open hole.

FIG. 1 shows steps according to an embodiment of the present invention. A method for mounting a covering member to an inner wall of a cylindrical tube will now be described according to the steps illustrated in FIG. 1. In the example described below, a covering member is attached to a cylindrical tube having an inner diameter of 70 mm.

(Step S1: Fabricate First Sheet)

In the present invention, a covering member made up of a first sheet and a laminated sheet assembly is attached to a sidewall of a cylindrical tube. The first sheet and the laminated sheet assembly are individually fabricated, and then joined together on a packer. The first sheet is fabricated first in this embodiment, but the laminated sheet assembly may be fabricated first.

First, a glass cloth is cut into first sheet 5 having a larger shape than the finished shape. The glass cloth is a cloth made of felted glass fibers, and a cloth (manufactured by Nitto Boseki CO., Ltd.) according to JIS WF230-100BS6 (0.25 mm thick) is used in the example. Then, first sheet 5 is impregnated with first resin 21. First resin 21 is preferably an epoxy resin and, in the example, has a bisphenol A type epoxy resin as a base resin and modified polyamine or modified aromatic polyamine as a curing agent.

Figure 2:
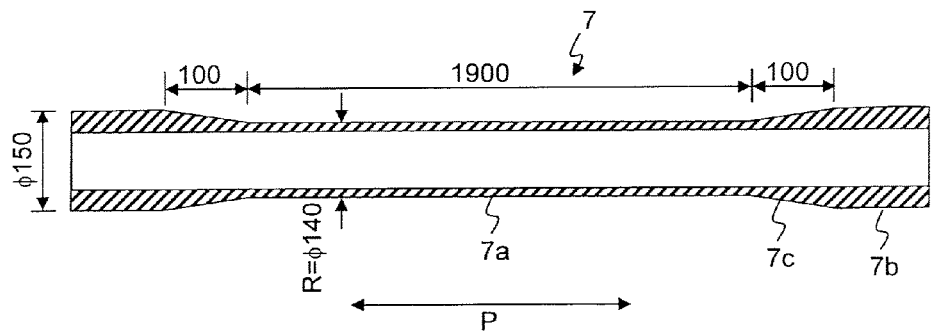
FIG. 2 is a sectional view of the core.
Figure 3:
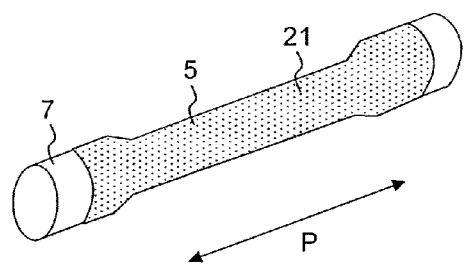
FIG. 3 is a perspective view of the first sheet wrapped around the core.

Then, first sheet 5 is wrapped around dedicated core 7. FIG. 2 shows a sectional view of the core. Core 7 includes small outer diameter portion 7a, large outer diameter portion 7b, and portion 7c that connects small outer diameter portion 7a to large outer diameter portion 7b and that has a gradually increasing outer diameter. In the example, the outer surface of an iron pipe having an outer diameter of 150 mm is cut to an outer diameter of 140 mm over a length of 1900 mm so that portions 7c are provided on opposite sides thereof over a length of 100 mm, wherein each portion 7c has an outer diameter that gradually increases from 140 mm to 150 mm. A plastic tape is applied to the outer surface of core 7 thus fabricated, and first sheet 5, impregnated with first resin 21, is wrapped around the plastic tape, as shown in FIG. 3. Applying the plastic tape allows first sheet 5 to be easily removed from core 7 after first resin 21 is cured.

First sheet 5 is wrapped around core 7 due to the adhesive force of first resin 21. By maintaining the state for a certain time, first resin 21 is cured while first sheet 5 is wrapped around core 7. Specifically, by curing first resin 21 while maintaining first sheet 5 with predetermined radius of curvature R, first sheet 5 is caused to memorize a shape of curvature having predetermined radius of curvature R. In the example, first sheet 5 memorizes a shape of curvature having predetermined radius of curvature R=70 mm, except for opposite ends thereof. Then, first sheet 5 is removed and cut into the predetermined shape described below. First sheet 5 is preferably wrapped around core 7 again so that the shape of curvature is maintained.

Figure 4:
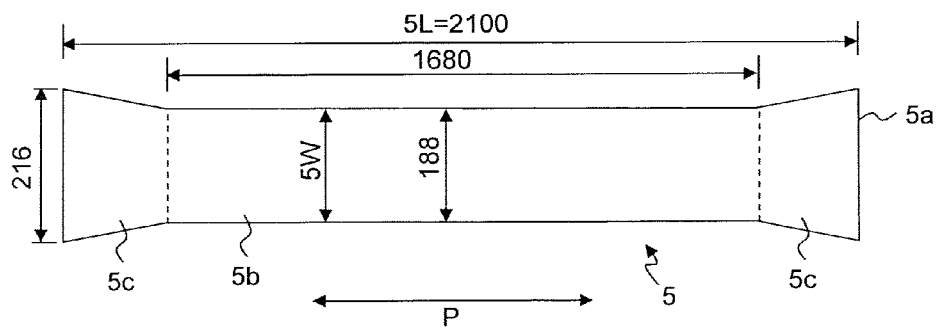
FIG. 4 is a plan view of the first sheet.

To describe the shape of first sheet 5 after cutting, some terms will be described. With reference to FIG. 4, "axial ends 5a" of first sheet 5 means two ends or two end sides 5a with regard to axial direction P of the cylindrical tube. "Axial length 5L" of the cylindrical tube means length 5L of first sheet 5 measured in axial direction P of the cylindrical tube. Width 5W of the cylindrical tube means lateral width 5W of first sheet 5 measured in a direction perpendicular to axial direction P of the cylindrical tube and has different values depending on axial positions on the cylindrical tube, as described below.

Widths 5W of first sheet 5 at two axial ends 5a are slightly smaller than the inner circumferential length of the cylindrical tube in order to prevent first sheet 5 from coming into contact with the sidewall of the cylindrical tube. If first sheet 5 comes into contact with the sidewall of the cylindrical tube, then first sheet 5 may be trapped between laminated sheet assembly 6 and the sidewall of the cylindrical tube and may prevent laminated sheet assembly 6 from tightly adhering to the inner wall of the cylindrical tube. In the example, widths 5W of first sheet 5 at axial end 5a are 216 mm, which is converted into a circumferential length of about 69 mm. First sheet 5 includes constant width portion 5b having constant width 5W that is smaller than width 5W at axial ends 5a and two width increasing portions 5c that sandwich constant width portion 5b therebetween with regard to axial direction P. Width increasing portions 5c have width 5W that gradually increases toward respective axial ends 5a of first sheet 5. This shape is highly important for forming the tapered portion of covering member 4 described later. The width of constant width portion 5b is slightly smaller than the inner diameter of covering member 4 after covering member 4 is mounted to the cylindrical tube. This prevents first sheet 5 from circumferentially overlapping each other after covering member 4 is mounted to the sidewall of the cylindrical tube. In the example, covering member 4 has an inner diameter of 61 mm after it is mounted, and constant width portion 5b has a width of 188 mm, which corresponds to a circumferential length of about 60 mm. FIG. 4 shows the shape and dimensions of first sheet 5 of the example.

In the embodiment, the glass cloth is cut into a predetermined shape after it is caused to memorize the shape in advance, but the glass cloth may be first cut into a predetermined shape, and then it may be impregnated with first resin 21 and may be wrapped around core 7.

(Step 2: Fabricate Laminated Sheet Assembly)

A plurality of sheets is attached to each other with second resin 22 in order to form laminated sheet assembly 6. Laminated sheet assembly 6 consists of glass cloths, chopped strand mats and roving cloths. The chopped strand mat is made by cutting strands into a predetermined length, distributing them in random directions, stacking them in an even thickness, and forming them into a mat. Chopped strand mat increases the strength of laminated sheet assembly 6 in all directions. The roving cloth is made by tying together into a strand several hundreds of filaments having a diameter of 10 to 15 μm, and drawing the strands evenly into a predetermined count and gathering them in a bundle. Roving cloth increases the strength of laminated sheet assembly 6 in axial direction P of the cylindrical tube.

Figure 5:
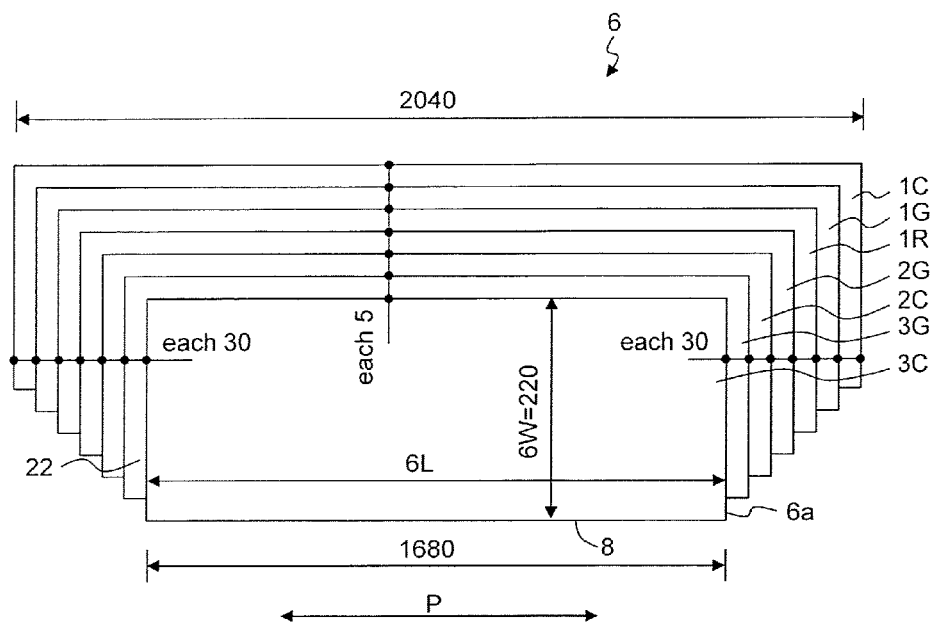
FIG. 5 is a schematic view showing the configuration of the laminated sheet assembly.

FIG. 5 shows a configuration of laminated sheet assembly 6. Laminated sheet assembly 6 is made up of seven sheets, namely first glass cloth 1C, first chopped strand mat 1G, first roving cloth 1R, second chopped strand mat 2G, second glass cloth 2C, third chopped strand mat 3G, and third glass cloth 3C, laminated in this order. In the example, a 0.25 mm thick cloth (manufactured by Nitto Boseki CO., Ltd.), JIS WF230-100BS6, is used as the glass cloth, a 0.5 mm thick mat (manufactured by Nitto Boseki CO., Ltd.), JIS MC-380A-104SS, is used as the chopped strand mat, and a 0.5 mm thick cloth (manufactured by Nitto Boseki CO., Ltd.), JIS WR-570C-100CS, is used as the roving cloth.

"Axial ends 6a", "axial length 6L", and "width 6W" of each sheet of laminated sheet assembly 6 are defined in a manner similar to those of first sheet 5. However, each sheet of laminated sheet assembly 6 has a rectangular shape, unlike first sheet 5. For each sheet of laminated sheet assembly 6, the closer that the sheet is located to the outermost side, when wrapped around first sheet 5, the larger is axial length 6L of the sheet. As described later, first glass cloth 10 is located on the outermost side when wrapped around first sheet 5, and third glass cloth 3C is located on the innermost side. In the example, axial length 6L of first glass cloth 10 is 2040 mm. Axial length 6L sequentially decreases in decrements of 60 mm for each sheet and axial length 6L of third glass cloth 3C is 1680 mm. On the other hand, the sheets have the same width 6W, which is 220 mm in the example.

In order to fabricate laminated sheet assembly 6, a PVC sheet is first placed on a worktable, and a polyethylene vinyl sheet is attached to the PVC sheet. Second resin 22 is applied to the polyethylene vinyl sheet, and first glass cloth 10 is then placed thereon so that first glass cloth 10 is impregnated with second resin 22. Similarly, sheets from first chopped strand mat 1G to third glass cloth 3C are placed on top of each other while being impregnated with second resin 22. In this case, centers of the sheets with regard to axial direction P of the cylindrical tube correspond to each other, and thus two axial ends 6a of each sheet are shifted inwardly by the same distance relative to two axial ends 6a of the immediately lower sheet. In the example, axial ends 6a of each sheet are located 30 mm inward relative to axial ends 6a of the immediately lower sheet. On the other hand, the position of each sheet with regard to the width direction is sequentially shifted in the same direction relative to the immediately lower sheet. In the example, the sheets are shifted in the width direction in increments of 5 mm, and as a result, the sheets are attached to each other in the positional relationship as shown in FIG. 5. Second resin 22 is preferably an epoxy resin and the same base resin and curing agent as those of first resin 21 may be used. The ratio of the base resin and the curing agent may be different from that of first resin 21.

(Step 3: Tentatively Fasten First Sheet to Packer)

Figure 6:
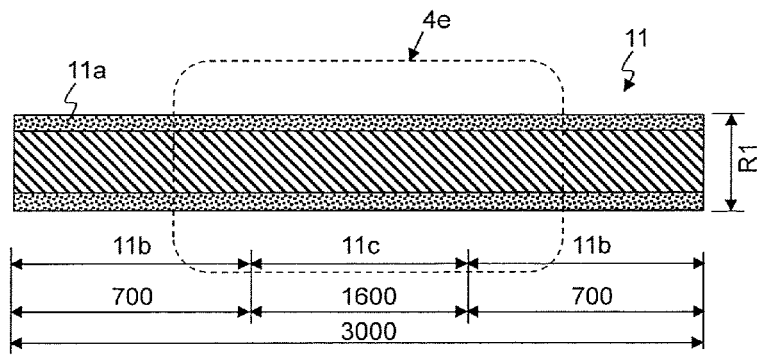
FIG. 6 is a side view of the packer.

First sheet 5 that memorizes the shape of curvature is wrapped around cylindrical packer 11. As shown in FIG. 6, packer 11 includes expanding rubber element 11a that is radially expandable, which may be radially expanded by a gas, such as nitrogen gas, supplied at a high pressure. In the example, a packer manufactured by Geopro S. A. (Belgium) is used. Packer 11, i.e., expanding rubber element 11a, has radius R1 that is smaller than shape-memorized predetermined radius R of first sheet 5, and radius R1 is 42 mm in the example.

First, opposite end regions 11b of packer 11 are tentatively fastened before first sheet 5 is wrapped around packer 11. Specifically, plastic tapes are wrapped around opposite end regions 11b of expanding rubber element 11a of packer 11 that sandwich axially central region 11c thereof. Covering member 4 is mounted to region 4e that includes entire axially central region 11c and part of each opposite end region 11b. In the example, axially central region 11c has a length of 1600 mm, and end region 11b has a length of 700 mm. The types of the plastic tape and the ways to wrap the plastic tape are selected such that the plastic tape is torn off when expanding rubber element 11a is expanded. Thus, when expanding rubber element 11a is expanded, axially central region 11c that is not fastened by the plastic tape is radially expanded first and opposite end regions 11b that are fastened by the plastic tapes are then radially expanded. If opposite end regions 11b are radially expanded first, then a closed space is created between axially central region 11c and the inner wall of the cylindrical tube and air in the space will remain. Such remaining air (air pocket) significantly prevents covering member 4 from tightly adhering to the cylindrical tube. Occurrence of a harmful air pocket is prevented by radially expanding axially central region 11c first so that the air that is present between axially central region 11c and the inner wall of the cylindrical tube is discharged from end regions 11b.

Figure 7:
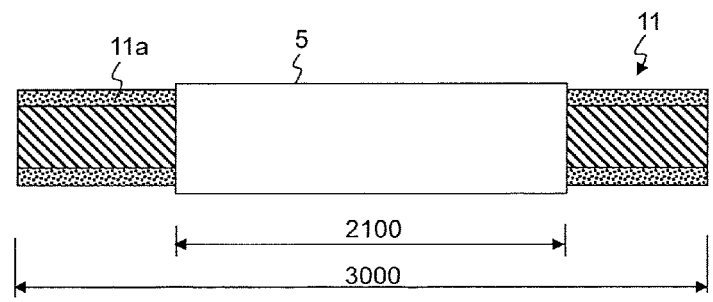
FIG. 7 is a side view of the first sheet wrapped around the packer.

Next, as shown in FIG. 7, first sheet 5 is wrapped around and tentatively fastened to the outer surface of expanding rubber element 11a of packer 11. Specifically, a plastic film having appropriate stretchability is first wrapped around expanding rubber element 11a and the plastic tape. First sheet 5 is wrapped around the plastic film as tightly as possible and is tentatively fastened by a paper tape. In this case, first sheet 5 is wrapped around packer 11 such that the concave surface of first sheet 5 faces the outer surface of packer 11, namely the outer surface of the packer 11 has the same bending orientation as the shape-memorized bending angle of first sheet 5. The types of the paper tape used for tentative fastening and the manner of wrapping the paper tape are selected such that the paper tape is torn off when expanding rubber element 11a is radially expanded.

(Step 4: Tentatively Fasten Laminated Sheet Assembly to Packer)

Laminated sheet assembly 6 is wrapped around the outer surface of first sheet 5, wrapped around packer 11, via third resin 23 and is tentatively fastened. Thus, covering member 4 that is made up of first sheet 5 and laminated sheet assembly 6 is formed on packer 11. Specifically, third resin 23 is applied to the outer surface of tentatively fastened first sheet 5 and the outer surface of the paper tapes used for tentative fastening. Third resin 23 may have the same composition as first resin 21. Laminated sheet assembly 6 is then wrapped around the outer surface of first sheet 5 in a positional relationship where third glass cloth 3C is in contact with first sheet 5 as shown in FIG. 8. FIG. 8 shows that first glass cloth 1C is located on the frontmost side and that the third glass cloth 3C is located on the backmost side. Laminated sheet assembly 6 is preferably wrapped from side 8 (see FIG. 5) where third glass cloth 3C protrudes. For each sheet of laminated sheet assembly 6, the closer that the sheet is located to the outermost side, the closer will two axial ends 6a of the sheet be located to the respective axial ends 5a of first sheet 5. Further, two axial ends 6a of each sheet are located in the corresponding width increasing portions 5c of first sheet 5. As a result, covering member 4 includes constant thickness portion 4a and tapered portions 4b located on opposite sides of constant thickness portion 4a with regard to axial direction P, and each tapered portion 4b has a radial thickness that decreases toward each axial end 5a of first sheet 5 (see FIG. 10).

Laminated sheet assembly 6 is positioned such that the center of laminated sheet assembly 6 with regard to the axial direction corresponds to the center of first sheet 5 with regard to the axial direction. Thus, two axial ends 6a of the uppermost first glass cloth 10 are separated inwardly from axial ends 5a of first sheet 5 by the same distance. This separation is 30 mm in the example. After laminated sheet assembly 6 is wrapped, laminated sheet assembly 6 is tentatively fastened by a paper tape. The types of the paper tape used for tentative fastening and the ways to wrap the paper tape are selected such that the paper tape is torn off when expanding rubber element 11a is radially expanded.

(Step 5: Insert Packer into Cylindrical Tube)

Fourth resin 24 is applied to the outer surface of laminated sheet assembly 6 of covering member 4. Fourth resin 24 may have the same composition as first resin 21. FIGS. 9A to 9C are conceptual diagrams illustrating a method for inserting and mounting the covering member into the cylindrical tube. As shown in FIG. 9A, packer 11 is connected, via high pressure hose 12, to a high pressure gas supply (not shown) provided in control unit 13. The packer 11 may be radially expanded by a high pressure gas (for example, nitrogen gas) that is introduced therein from the high pressure gas supply.

Next, as shown in FIG. 9B, packer 11 is inserted to predetermined position 17 in cylindrical tube 16 via high pressure hose 12. In FIGS. 9B and 9C, the ground equipment shown in FIG. 9A is omitted. High pressure hose 12 also has a function of suspending packer 11 and is connected to a drive mechanism (not shown), such as an electric winch or a hydraulic winch, provided in control unit 13 via some pulleys 14a, 14b supported by tripod 15. Thus, covering member 4 supported by packer 11 may be moved up and down in cylindrical tube 16 by actuating the drive mechanism.

Figure 10:
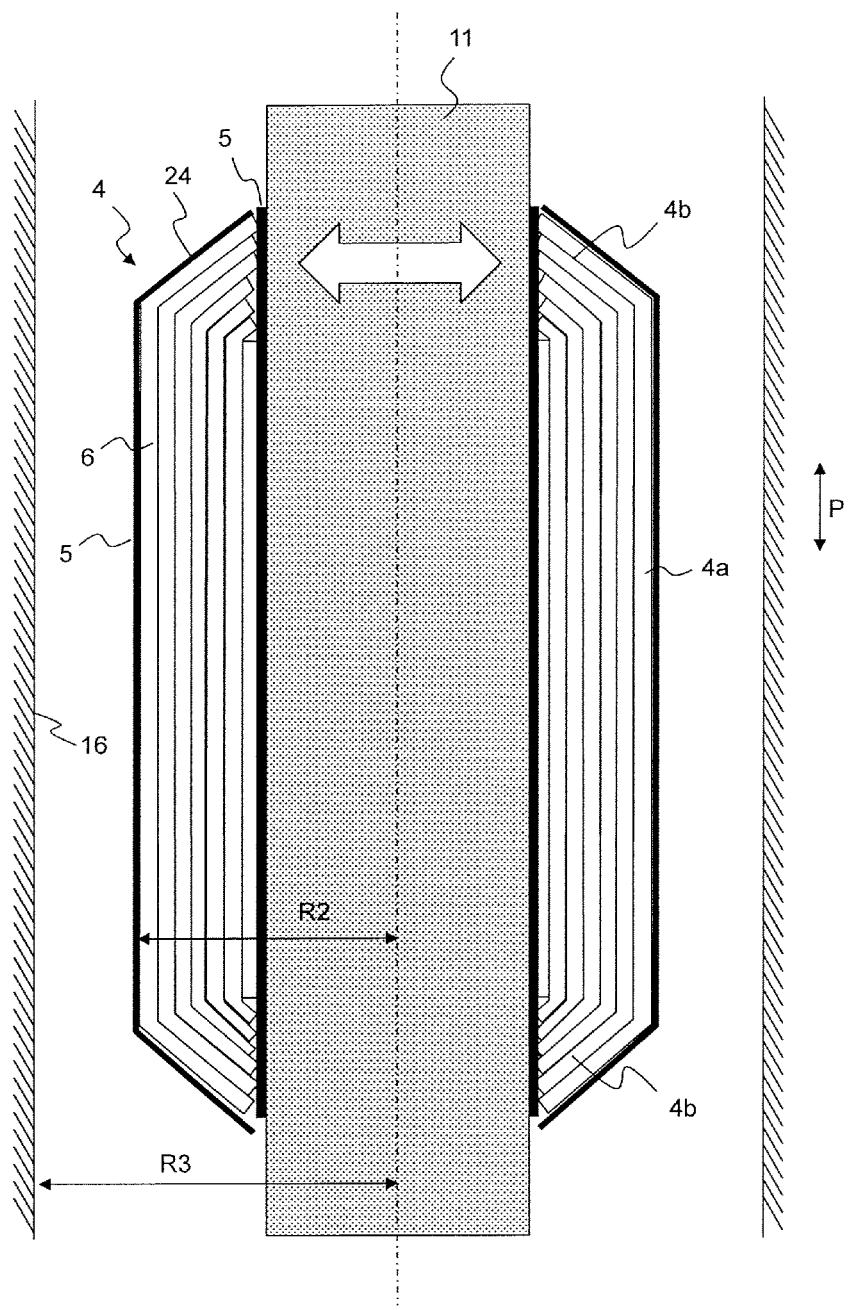
FIG. 10 is a side view of the packer that is suspended down to a predetermined position in the cylindrical tube.

FIG. 10 shows packer 11 that has been suspended down to the predetermined position. Radius R3 of cylindrical tube 16 is smaller than the predetermined radius of curvature R and larger than radius R2 of the outer surface of fourth resin 24. At this time, first resin 21 has been cured, but second to fourth resins 22 to 24 have not been cured. Relative movement between first sheet 5 and laminated sheet assembly 6 and relative movement between adjacent sheets of laminated sheet assembly 6 are only limited by the paper tape. Since first sheet 5 and laminated sheet assembly 6 are tightly wrapped around packer 11, tapered portions 4b located at the upper and lower ends of covering member 4 extend on packer 11, and the outer diameter of tapered portion 4b decreases toward the end.

(Step 6: Attach Covering Member to Sidewall of Cylindrical Tube)

Figure 11:
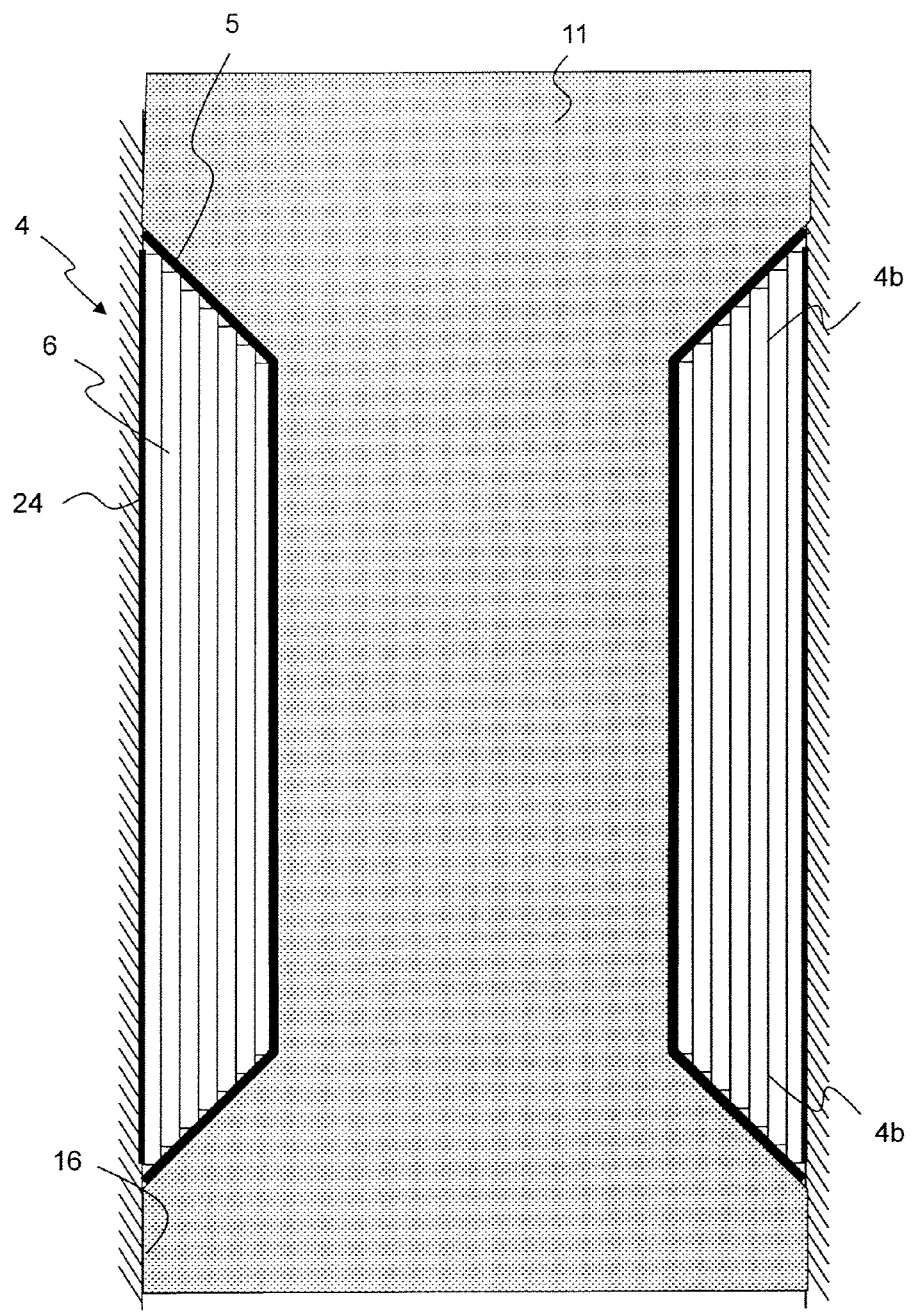
FIG. 11 is a side view of the packer that is radially expanded at the predetermined position in the cylindrical tube.

Next, as shown in FIG. 9C, packer 11 is radially expanded in cylindrical tube 16. Specifically, another quantity of the high pressure gas is supplied from the high pressure gas supply to packer 11 in order to expand packer 11. FIG. 11 shows packer 11 that is radially expanded. As packer 11 is radially expanded, first sheet 5 and each sheet of laminated sheet assembly 6 are also radially expanded. Thus, the paper tape that temporarily fastens first sheet 5 and laminated sheet assembly 6 is torn off and the tentative fastening of first sheet 5 and laminated sheet assembly 6 are released. First sheet 5 and each sheet of laminated sheet assembly 6 can be radially expanded smoothly because they are allowed to move relative to each other in the circumferential direction. Covering member 4 is finally pressed against the inner wall of cylindrical tube 16 via fourth resin 24. In the example, Step 6 can be performed in about 30 seconds. Since tapered portions 4b of covering member 4 are pressed against packer 11, tapered portions 4b extend on the inner wall of cylindrical tube 16 and the inner diameter of tapered portions 4b increases toward the end.

First sheet 5 is wrapped around packer 11 with radius R1 that is smaller than the shape-memorized predetermined radius of curvature R. Accordingly, an elastic reactive force to increase the diameter is produced when the tentative fastening is released. The elastic reactive force presses not only first sheet 5 itself but also laminated sheet assembly 6 against the inner wall of cylindrical tube 16. First sheet 5 continues to apply the elastic reactive force to laminated sheet assembly 6 even after laminated sheet assembly 6 is pressed against the inner wall of cylindrical tube 16. Thus, without the pressing force of packer 11, laminated sheet assembly 6 is held on the inner wall of cylindrical tube 16 by first sheet 5.

The outermost first glass cloth 10 of laminated sheet assembly 6 has a width that is substantially equal to the circumferential length of cylindrical tube 16. In the example, first glass cloth 10 has a width of 220 mm, which is substantially equal to the circumferential length (70 mm×π) of cylindrical tube 16. Thus, first glass cloth 10 tightly adheres to the inner wall of cylindrical tube 16 without generating any gap or without overlapping each other and effectively seals the inside of cylindrical tube 16 from outside of cylindrical tube 16. On the other hand, each sheet of laminated sheet assembly 6, except the outermost sheet, has a circumferentially overlapping part when it is attached to the sidewall of cylindrical tube 16. In the example, each sheet has a width of 220 mm, which is larger than the circumferential length at its radial position when covering member 4 is attached to cylindrical tube 16. The circumferentially overlapping parts enhance sealing performance. As described above, the sheets of laminated sheet assembly 6 are attached to each other while being shifted in the width direction, thereby having different overlapping positions in the circumferential direction. This prevents significantly large local variation of the thickness of laminated sheet assembly 6.

(Step 7: Pull Out Packer from Cylindrical Tube)

Packer 11 is radially contracted and pulled out from cylindrical tube 16. Since covering member 4 is pressed against the inner wall of cylindrical tube 16 due to the elastic reactive force of first sheet 5, as described above, packer 11 can be pulled out from cylindrical tube 16 immediately after completion of Step 6. Since first resin 21 that impregnated first sheet 5 has been already cured, packer 11 can be radially contracted smoothly without producing a large frictional force or a resistive force between first sheet 5 and the plastic film that covers the surface of packer 11.

(Step 8: Attach Covering Member to Cylindrical Tube)

Second, third, and fourth resins 22 to 24 are cured to attach covering member 4 to the sidewall of cylindrical tube 16. The resins are cured in about 24 hours and firmly attach covering member 4 to the inner wall of cylindrical tube 16. This step is completed by simply waiting for a lapse of a predetermined time without requiring any specific operation.

(Step 9: Attach Second Covering Member to Sidewall of Cylindrical Tube)

Since the length of the covering member is limited by the length of the packer, covering members need to be sequentially attached to the sidewall of the cylindrical tube when the cylindrical tube is long. A second or subsequent covering member may also be attached to the sidewall of the cylindrical tube in accordance with Steps 1 to 8 described above. Among these steps, Step 1 may be performed on site for each covering member, or a plurality of first sheets 5 may be fabricated in advance at a factory or the like. When a plurality of packers is available, Steps 2 to 4 may be performed on site, and Step 5 and the subsequent steps may be performed immediately after another packer is pulled out from the cylindrical tube. A case where two covering members are sequentially attached to the sidewall of the cylindrical tube will be described here. In the description below, the covering member provided first is referred to as first covering member 41, and the covering member provided later is referred to as second covering member 42.

FIGS. 12A and 12B illustrate a method for mounting second covering member 42. First covering member 41 is attached to cylindrical tube 16 in accordance with Steps 1 to 8 described above. Second covering member 42 is also attached to cylindrical tube 16 in accordance with Steps 1 to 8 described above. However, Steps 5, 6 are performed as described below. First, in Step 5, the position of packer 11 that holds second covering member 42 is adjusted such that opposed tapered portions 41b, 42b of first covering member 41 and second covering member 42 overlap each other, as shown in FIG. 12A. Packer 11 is suspended down to a position where boundary 42c between tapered portion 42b and constant thickness portion 42a of second covering member 42 is positioned at the same level as tip end 41d of tapered portion 41b of first covering member 41. Tapered portion 42b of second covering member 42 may partially overlap with tapered portion 41b of first covering member 41 with regard to axial direction P of the cylindrical tube. However, tapered portion 42b preferably completely overlaps tapered portion 41b of first covering member 41 with regard to axial direction P and only overlaps tapered portion 41b of first covering member 41.

In Step 6, packer 11 is radially expanded, as shown in FIG. 12B. Tapered portion 41b of second covering member 42 abuts against and presses the inner surface of tapered portion 41b of first covering member 41. Tapered portion 42b of second covering member 42 is provided to ride on the inner surface of tapered portion 41b of first covering member 41. As a result, an inner surface profile that is substantially as flat as constant thickness portions 41a, 42a can be obtained along the boundary between first covering member 41 and second covering member 42. Due to the elastic reactive force described above, the first sheet of second covering member 42 presses tapered portion 41b of first covering member 41 radially outwardly via second covering member 42. Thus, high sealing performance can also be obtained at the boundary between first covering member 41 and second covering member 42. When there are three or more covering members, Step 9 may be repeated as many times as required.

In the example, first sheet 5 has an axial length of 2100 mm and tapered portion 41b has an axial length of 210 mm. Thus, packer 11 is set 1890 mm (2100 mm-210 mm) above the vertical level of packer 11 for first covering member 41 so that first covering member 41 and second covering member 42 overlap by a length of 210 mm.

Figure 13A:
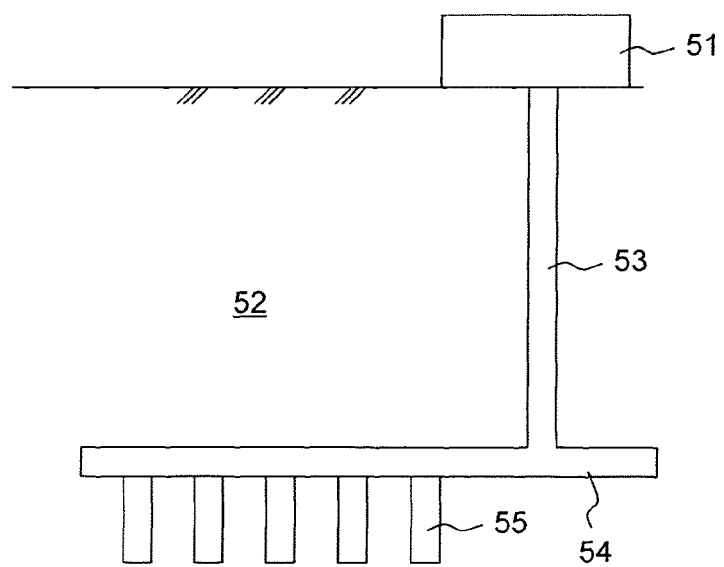
FIG. 13A is a conceptual diagram illustrating the application of the present invention to geological disposal of high level radioactive waste.
Figure 13B:
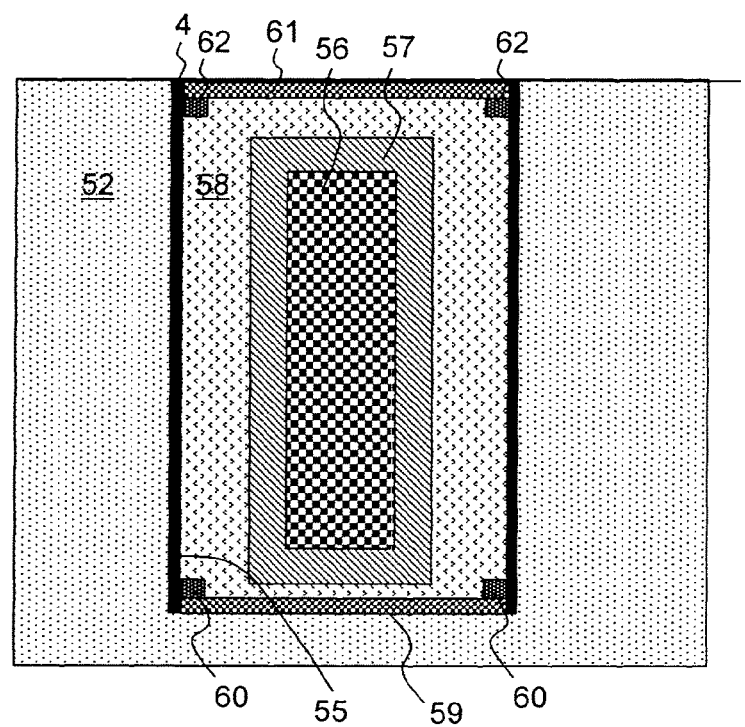
FIG. 13B is a conceptual diagram illustrating the application of the present invention to geological disposal of high level radioactive waste.

The present invention may also be applied to geological disposal of high level radioactive waste. FIGS. 13A and 13B are conceptual diagrams illustrating geological disposal of high level radioactive waste. As shown in FIG. 13A, pit 53 extends from ground receiving equipment 51 for high level radioactive waste to underground rock 52, and adit 54 that is connected to pit 53 extends in rock 52. A number of disposal pits 55, which are rock cavities, vertically extend from adit 54. As shown in FIG. 13B, overpack 57, which is a metal container that houses vitrified waste 56, is provided in disposal pit 55. Buffer material 58, which is made of clay that blocks groundwater, is filled into the space between housing pit 56 and overpack 57. Bottom lid 59 made of FRP is provided at the bottom surface of housing pit 55. Covering member 4 is provided on the sidewall of housing pit 55 in accordance with the present invention and the peripheral edge of bottom lid 59 is bonded to the lower end of covering member 4 by means of adhesive 60. Further, top lid 61 made of FRP is provided on the upper end of disposal pit 55 and the peripheral edge of top lid 61 is bonded to the top of covering member 4 by means of adhesive 62. Penetration of groundwater can be prevented more effectively by tightly enclosing overpack 57 in this manner. In this case, shielding performance of disposal pit 55 can be enhanced by including a lead sheet in the laminated sheet assembly, bottom lid 59 and top lid 61. The lead sheet may be provided, for example, between first sheet 5 and first glass cloth 1C. Alternatively, a similar effect may be obtained by including barium sulfate in at least any one of first to fourth resins 21 to 24. In the geological disposal of high level radioactive waste, the vitrified waste, the overpack, the buffer material and rock function as a multi-barrier against radioactive waste, and the lead sheet and the resins that contain barium sulfate function as an additional barrier.

The present invention may be further applied to a new well. A method for providing a new well generally includes inserting a hollow casing into an open hole, pouring cement slurry into an annular space (annulus portion) between the open hole and the casing and hardening the cement slurry. Since the sidewall of the open hole is typically made of rock, covering member 4 may be formed on the sidewall of the open hole in accordance with the present invention in order to complete the well. Conventionally, there are known problems, such as a phenomenon in which cement slurry does not sufficiently spread over the annulus portion (channeling) and poor cement bonding. However, the present invention reduces the risk of faulty construction by directly attaching covering member 4 to the sidewall (rock) of the open hole. In addition, the method of mounting a casing in an open hole via cement results in a well having a significantly smaller inner diameter than the open hole when the well is completed. The present invention makes it possible to construct a well having substantially the same inner diameter as the open hole because the thickness of the covering member may be reduced to several millimeters.

What is claimed is:

1. A mounting method for attaching a covering member to an inner wall of a cylindrical tube, the covering member having a first sheet and a laminated sheet assembly, the method comprising:

causing the first sheet to memorize a shape of curvature having a predetermined radius of curvature by curing a first resin while holding the first sheet with the predetermined radius of curvature, the first sheet being impregnated with the first resin;

wrapping the first sheet around a radially expandable cylindrical packer and tentatively fastening the first sheet to the packer, wherein the first sheet memorizes the shape of curvature and the packer has a radius that is smaller than the predetermined radius of curvature;

forming a laminated sheet assembly by attaching a plurality of sheets to each other with a second resin;

forming the covering member by wrapping the laminated sheet assembly around an outer surface of the first sheet via a third resin and tentatively fastening the laminated sheet assembly, the first sheet being wrapped around the packer;

applying a fourth resin to an outer surface of the laminated sheet assembly of the covering member;

inserting the packer into a cylindrical tube having a radius that is smaller than the predetermined radius of curvature and that is larger than a radius of an outer surface of the fourth resin;

radially expanding the packer in the cylindrical tube to release the tentative fastening of the first sheet and the laminated sheet assembly, thereby pressing the covering member against the inner wall of the cylindrical tube via the fourth resin;

pulling out the packer from the cylindrical tube; and curing the second, third, and fourth resins to attach the covering member to the inner wall of the cylindrical tube.

2. The mounting method according to claim 1, wherein the first sheet and each sheet of the laminated sheet assembly each have two axial ends with regard to an axial direction of the cylindrical tube, an axial length that is measured in the axial direction of the cylindrical tube, and a width that is measured in a direction perpendicular to the axial direction of the cylindrical tube, wherein the widths of the first sheet at the two axial ends are substantially equal to an inner circumferential length of the cylindrical tube, wherein the first sheet includes a constant width portion having a constant width that is smaller than the widths of the first sheet at the axial ends and two width increasing portions that sandwich the constant width portion therebetween with regard to the axial direction, widths of width increasing portions gradually increasing toward respective axial ends of the first sheet, wherein for each sheet of the laminated sheet assembly, the closer that the sheet is located to the outermost side, when wrapped around the first sheet, the larger is the axial length of the sheet, and wherein each sheet of the laminated sheet assembly is laminated such that the closer that the sheet is located to the outermost side, when it is wrapped around the first sheet, the closer will the two axial ends of the sheet be located to the respective axial ends of the first sheet and such that the two axial ends of each sheet are located in the respective width increasing portions of the first sheet, thereby creating tapered portions at axially opposite ends of the covering member, the tapered portions having radial thicknesses that gradually decrease toward respective axial ends of the first sheet.

3. The mounting method according to claim 2, further comprising sequentially attaching a plurality of the covering members to the inner wall of the cylindrical tube, wherein the adjacent covering members are formed such that the opposed tapered portions of the preceding covering member and the following covering member overlap each other and such that the tapered portion of the following covering member rides on an inner surface of the tapered portion of the preceding covering member.

4. The mounting method according to claim 3, wherein the opposed tapered portions of the preceding covering member and the following covering member completely overlap each other with regard to the axial direction.

5. The mounting method according to claim 1, wherein the sheets of the laminated sheet assembly are attached to each other with sides of the sheets being sequentially shifted in a width direction, the sides being parallel to the axial direction of the cylindrical tube.

6. The mounting method according to claim 1, wherein each sheet of the laminated sheet assembly, except the outermost sheet, has a circumferentially overlapping part when the sheet is attached to the inner wall of the cylindrical tube.

7. The mounting method according to claim 1, wherein the opposite end regions of the packer are tentatively fastened before the first sheet is wrapped around the packer so that an axially middle region of the packer is radially expanded before opposite end regions are expanded, wherein the opposite end regions sandwich the axially middle region therebetween.

8. The mounting method according to claim 1, wherein the first sheet and the laminated sheet assembly are tentatively fastened by wrapping a paper tape around an outer surface of the first sheet and an outer surface of the laminated sheet assembly, respectively, and the tentative fastening is released by radially expanding the packer and thereby tearing off the paper tape.

9. The mounting method according to claim 1, wherein the laminated sheet assembly includes a glass cloth, a chopped strand mat and a roving cloth.

10. The mounting method according to claim 1, wherein the laminated sheet assembly includes a lead sheet.

11. The mounting method according to claim 1, wherein at least any resin from among the first to fourth resins contains barium sulfate.

12. The mounting method according to claim 1, wherein the cylindrical tube has a cylindrical inner surface and includes an open hole, an oil well tube, a gas well tube, a water well, a hot spring well, a reinjection well and a rock cavity for storing high level radioactive waste.

* * * * *